United States Patent [19]

Arvaï

[11] Patent Number: 4,538,488
[45] Date of Patent: Sep. 3, 1985

[54] TOOL-MAKER'S LATHE

[75] Inventor: Tibor Arvaï, Monte Carlo, Monaco

[73] Assignee: S. A. Fouquet, Brie, France

[21] Appl. No.: 491,331

[22] PCT Filed: Sep. 9, 1982

[86] PCT No.: PCT/FR82/00146
§ 371 Date: May 3, 1983
§ 102(e) Date: May 3, 1983

[87] PCT Pub. No.: WO83/00827
PCT Pub. Date: Mar. 17, 1983

[30] Foreign Application Priority Data

Sep. 10, 1981 [MC] Monaco ................................. 1538

[51] Int. Cl.³ ............................................. B23B 17/00
[52] U.S. Cl. ........................................ 82/32; 82/6 R
[58] Field of Search .................. 82/32, 30, 2 R, 28 R, 82/6 R, 6 A, 36 R; 144/1 R, 1 C

[56] References Cited

U.S. PATENT DOCUMENTS 1,469,226 10/1923 Langhammer ....................... 82/6 R
2,719,761 10/1955 Bonnafe ................................. 82/32
3,256,754 6/1966 Rivierre et al. ............................ 82/8

FOREIGN PATENT DOCUMENTS 937700   8/1948  France .
1517992  3/1968  France .
2381935  9/1978  France .
2448965  9/1980  France .
278064   1/1951  Switzerland ............................. 82/6
350527   1/1961  Switzerland ........................... 82/32

Primary Examiner—Leonidas Vlachos
Assistant Examiner—Jerry Kearns
Attorney, Agent, or Firm—Fleit, Jacobson, Cohn & Price

[57] ABSTRACT

The lathe of the present invention includes a bed having a slide surface in the form of a dovetail and two heads for mounting a work piece on the bed. The bed is a die-shaped section with one side extending in the shape of a dovetail. The heads are two portions formed from the same die-shaped section having one side in the form of a dovetail, complementary to the dovetail of the bed. The dovetail of each head and the dovetail of the bed are slidable one within the other.

7 Claims, 4 Drawing Figures

FIG_1

FIG_2

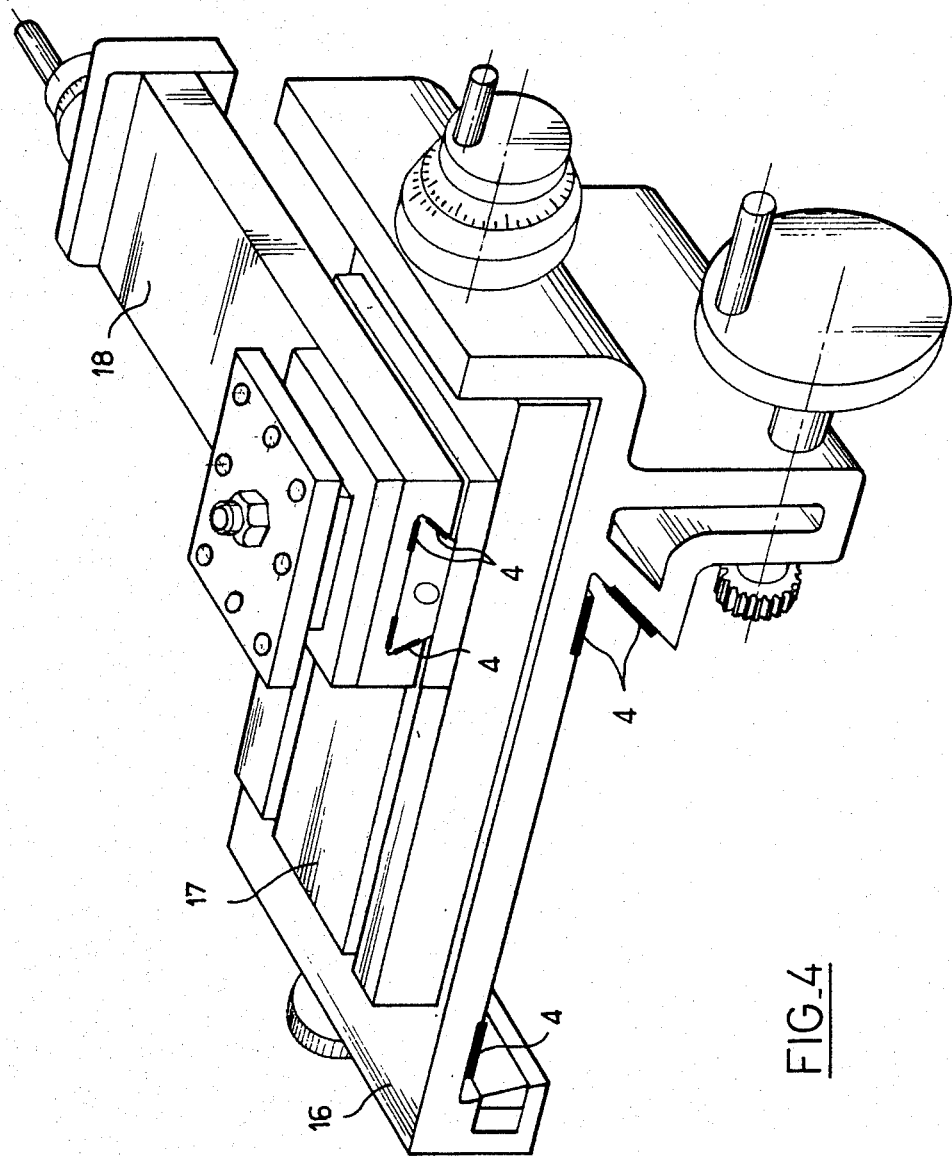
FIG_4

TOOL-MAKER'S LATHE

The invention relates to a tool-maker's lathe of the type comprising a bed on which are mounted two heads, usually one fixed and one movable along the bed, for holding the workpiece.

The two heads determine respectively the axis of rotation of the workpiece and must be perfect coaxial, which one obtains gradually by adjustments on the heads and on the bed after production.

The present invention aims at ensuring a perfect coaxial alignment of the heads by a single action of their manufacture.

Another aspect of the invention is to provide a lathe of which the price is appreciably lower than that of known lathes of the same general type.

The lathe of the invention, which comprises a bed presenting a slide surface in the form of a dovetail and which comprises two heads for mounting the workpiece on the bed, is characterised in that the bed is a die-shaped section in its final form and of which one side is shaped in the form of a dovetail and in that the heads are two portions of the same die-shaped section which presents one side in the form of a dovetail complementary to the dovetail of the bed, so that the dovetail of each head and the dovetail of the bed can slide one on the other.

A typical embodiment of a lathe according to the invention will be described below with reference to the figures of the accompanying drawings, the description and the figures causing to appear other characteristics of the present invention, useful both together and separately.

FIG. 4 is a perspective view a prespective view of the saddle equipped with a cross-slide and a compound slide.

Figure 1:
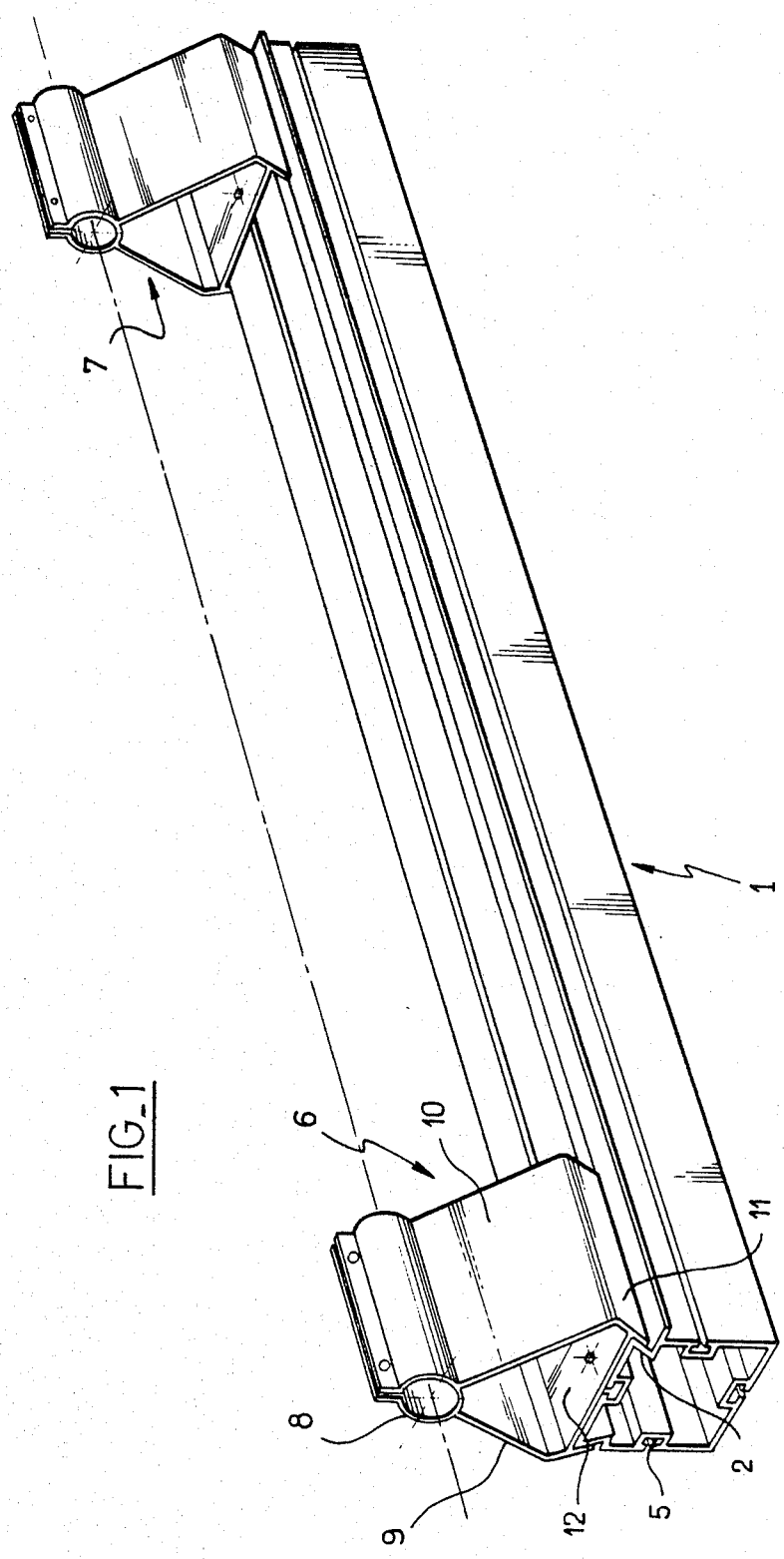
FIG. 1 is a schematic perspective view of the bed and the heads.
Figure 2:
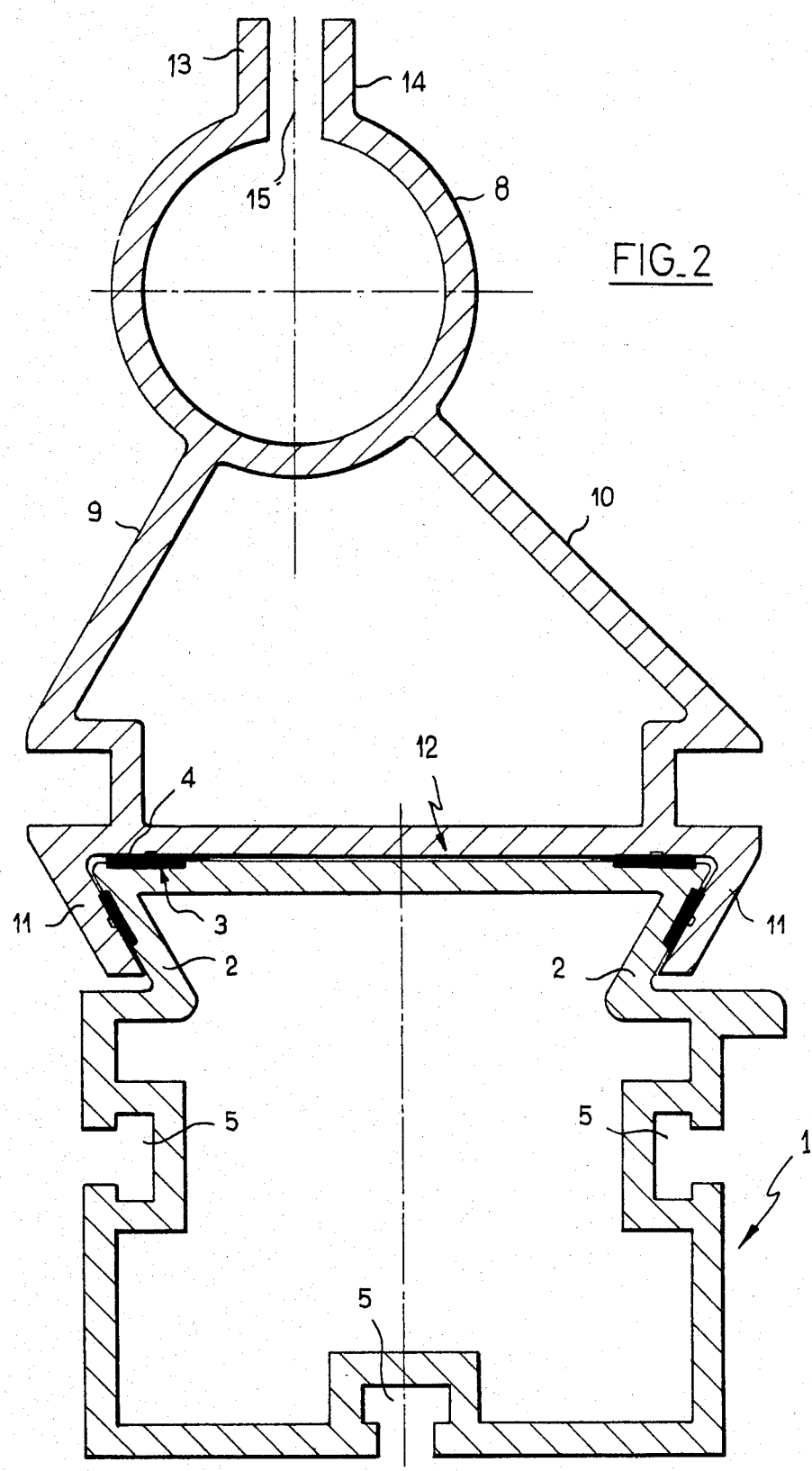
FIG. 2 is a vertical cross-section of one head on the bed.
Figure 3:
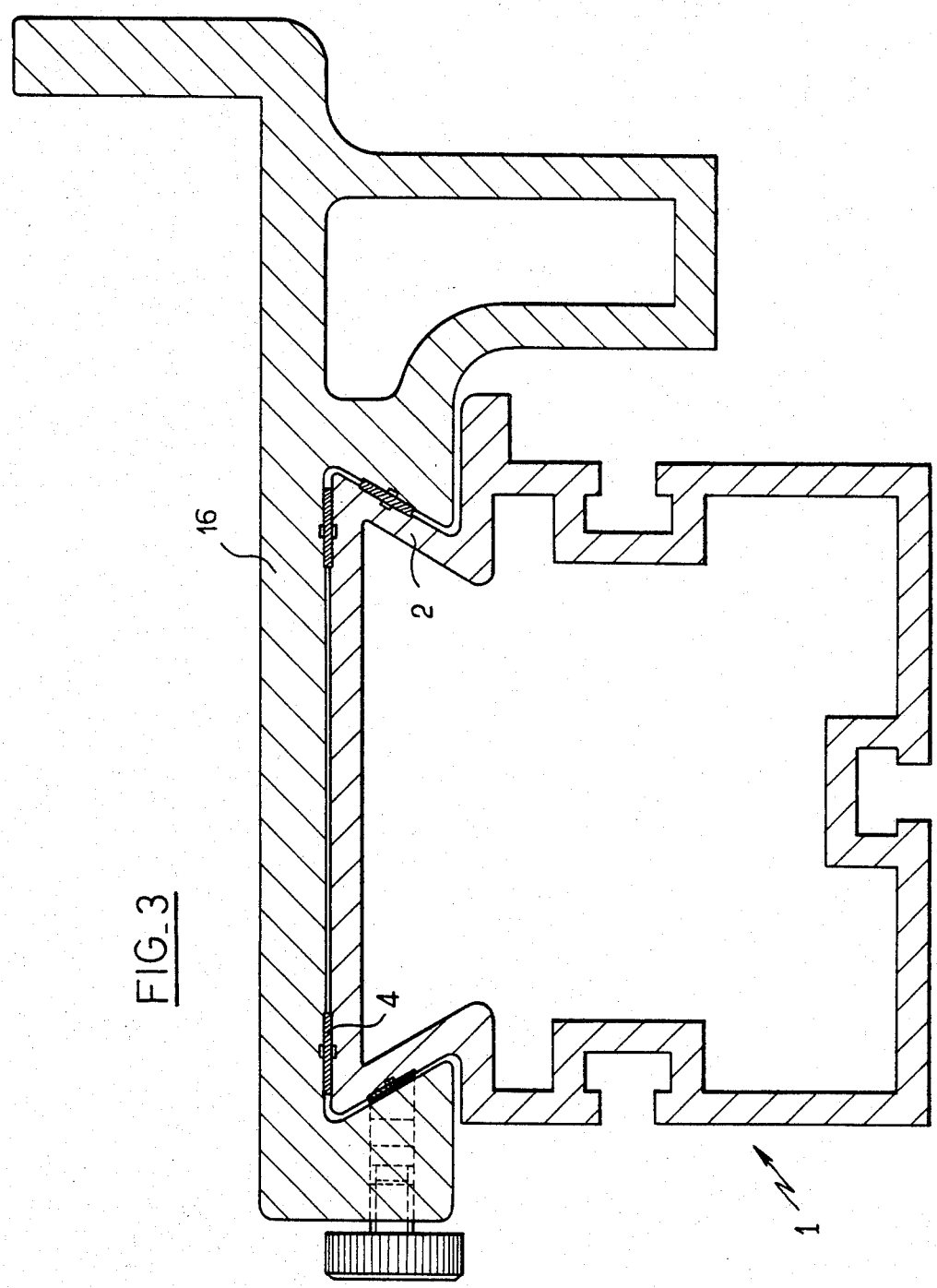
FIG. 3 is a vertical cross-section of a saddle in place on the bed.

The bed 1 (FIGS. 1 to 3) is a high precision rectangular tube of aluminium in its final form as extruded from a die and cut to the desired length. (The actual technique permits accuracies better than 1/100 of a millimeter).

The dovetail 2 of the bed is provided with grooves 3 for receiving bearing strips 4, for example strips of spring steel, held in place by gluing or otherwise.

The bed is provided on its faces with T-shaped grooves permitting the fitting of different accessories such as milling heads for example, or different clamps.

The fixed head or headstock 6 and the movable head or tailstock 7 are provided of the same extruded aluminium section, only their length being different.

The section of the heads (FIG. 2) has a cylindrical part 8 and two wings 9,10 cooperating to constitute a stand below the cylindrical part, each wing presenting an upper edge connecting to the cylindrical part and presenting a lower edge, the lower edges of the two wings cooperating to constitute the dovetail 11 of the head, and the two wings being connected by a transverse longitudinal 12.

The cylindrical part 8 of the section of the heads is split and has two longitudinal lips 13,14 on either side of the split 15, so as to permit tightening of the cylinder without displacement of the centre of the cylinder.

The lathe has a tool-carrying saddle 16 (FIG. 3) comprising in a known manner a cross-slide 17 and a compound slide 18 (FIG. 4). In accordance with the invention, the saddle and the two slides are also of die-shaped sections which present dovetails provided, like the bed, with bearing strips 4.

The shape of the sections can be varied without departing from the scope of the invention. One may note for example that the sections of the heads shown in FIGS. 1 and 2 have different forms of wings 9,10.

The bearing strips are distributed according to choice on one or both of the dovetails of pairs of cooperating dovetails.

In the embodiment shown, the dovetail of each head caps the dovetail on the bed on which it is engaged. In a variant, the forms and positions of the dovetails are reversed.

One may obtain other variants by replacing the arrangements described by equivalent arrangements, that is to say fulfilling the same functions.

The other items which normaly equip the lathe (drive motor, saddle-traverse rack, chuck, tail-stock centre, etc.) have not been shown on the Figures, because the invention is not in these items which remain conventional.

I claim:

1. In a tool-maker's lathe comprising:
   a bed made of an extrudable material and formed from an extruded die shaped section;
   two heads made of an extrudable material slidably mounted on said bed to support a workpiece, said two heads being two portions of a same extruded die-shaped section;
   first dovetail means located on one side of said two heads;
   second dovetail means located on said bed being shaped complementary to said first dovetail means for slidably receiving said first dovetail means and for permitting sliding of said two heads on said bed; and
   each of said two heads includes a cylindrical part and two wings, a stand defined by said two wings being located below the cylindrical part, each wing including an upper edge connected to the cylindrical part and a lower edge, a transverse section having lower edges and connected to the lower edges of each wing the lower edges of the transverse section defining said first dovetail means, and the cylindrical part being split and two longitudinal lips defined by said cylindrical part being located on either side of the split.

2. A tool-maker's lathe as claimed in claim 1, wherein said bed is a tube of generally rectangular form.

3. A tool-maker's lathe as claimed in claim 2, wherein said tube includes at least one side defining T-shaped longitudinal grooves for the fitting of accessories.

4. A tool-maker's lathe as claimed in claim 1, further comprising a saddle, a cross-slide slidably mounted on said saddle and a compound slide slidingly mounted on said cross-slide, said cross-slide and said compound slide each defining interfitting dovetails.

5. A tool-maker's lathe as claimed in claim 4, wherein said saddle is formed from die-shaped aluminum.

6. A tool-maker's lathe as claimed in claim 1, wherein said bed and said two heads define longitudinal grooves adapted to receive bearing strips.

7. A tool-maker's lathe as claimed in claim 1, wherein said bed and said two heads are formed of aluminum.

* * * * *